United States Patent
Duong

(10) Patent No.: US 11,811,882 B2
(45) Date of Patent: Nov. 7, 2023

(54) GUEST ACCESS MANAGEMENT IN A MOBILE APPLICATION

(71) Applicant: QUADIENT TECHNOLOGIES FRANCE, Bagneux (FR)

(72) Inventor: Dinh Cuong Duong, Bourg-la-Reine (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 0 days.

(21) Appl. No.: 17/645,393

(22) Filed: Dec. 21, 2021

(65) Prior Publication Data
US 2022/0247836 A1 Aug. 4, 2022

(30) Foreign Application Priority Data
Jan. 29, 2021 (EP) .................................. 21305126

(51) Int. Cl.
| | |
|---|---|
| H04L 67/00 | (2022.01) |
| H04L 67/55 | (2022.01) |
| H04L 9/40 | (2022.01) |
| H04L 67/141 | (2022.01) |

(52) U.S. Cl.
CPC ............ *H04L 67/34* (2013.01); *H04L 63/062* (2013.01); *H04L 63/0838* (2013.01); *H04L 67/141* (2013.01); *H04L 67/55* (2022.05)

(58) Field of Classification Search
CPC ....... H04L 67/34; H04L 67/55; H04L 63/062; H04L 63/0838; H04L 67/141
See application file for complete search history.

(56) References Cited

U.S. PATENT DOCUMENTS

| | | | |
|---|---|---|---|
| 2015/0254726 A1* | 9/2015 | Cassidy | ................. G06Q 50/12 705/14.58 |
| 2016/0057626 A1 | 2/2016 | Otoole et al. | |

OTHER PUBLICATIONS

Partial European Search Report for EP 21 30 5126, dated Jul. 19, 2021, 12 pages.

* cited by examiner

*Primary Examiner* — Suraj M Joshi
(74) *Attorney, Agent, or Firm* — Cozen O'Connor

(57) ABSTRACT

Identifying as a guest a user of a mobile application on a mobile device includes: following a selection to use the mobile application in guest mode, sending by an access request to a web server of a web platform, including a device token generated by a trusted provider, generating by the web server a guest user ID and sending the guest user ID to the mobile application, generating a passcode and sending the passcode along with the device token to the trusted provider, relaying by the trusted provider through a push notification service the passcode to the mobile device and the mobile application, returning by the mobile application the passcode along with the guest user ID to the web server, verifying that the returned passcode matches the guest user ID and, in case of positive match, creating a user account in a database, using the guest user ID as identifier.

15 Claims, 4 Drawing Sheets

GUEST ACCESS MANAGEMENT IN A MOBILE APPLICATION

TECHNICAL FIELD

The present invention relates to the field of mobile applications, and notably to a method of providing access to guest users not willing to create a permanent account when trying a new app, while maintaining ease of use and a high level of information security and data privacy.

BACKGROUND

Mobile apps have becomes part of everyday's life for most Smartphone users. They cover a wide range of applications, including social networking, media playing, content sharing, GPS navigation, online banking, gambling, videogames, news, sport, healthcare and wellbeing, notwithstanding the ones designed for business users. The list is virtually unlimited and new apps are launched on a regular basis. Consequently, it may be complicated for consumers or professionals to select the right app for an intended use, and app's designers are striving to make it more appealing and to reduce friction.

One early source of friction is the need to create an account. Account creation requires some time and effort (e.g. reading standard terms of use) and prospective users may be reluctant to provide contact details such as an email address or phone number. Others may not want to remember a password for an app they are not sure yet to adopt.

It is of course possible to let the user try the application in guest mode without registering, giving access to a limited set of features. Holding features behind the registration wall is an incentive to create an account. However it generally results in a poorer experience, and some frustration if the interaction history is not recorded. For instance, when visiting the app a second time, the transactions and unique profile created by a user may be lost. This is particularly annoying if he/she finally wants to register. Other users may prefer to continue as guest for a period of time, but still appreciate to retrieve tracks of their previous actions. Such users may be sent in-app messages calling for registration with a welcome gift after using the app in guest mode a number of times.

Enabling a guest mode in a mobile application may present information security risks. For instance, an attacker may want to impersonate a guest user in order to cause malfunction of the service, or capture personal data from legitimate (guest or registered) users. An attacker may also want to cause a DOS (denial of service) or DDOS (distributed denial of service) by simulating a huge number of guest users connecting at the same time. So a method is needed for uniquely and unambiguously identifying a guest user before he/she registers to a mobile application. The method shall ensure that the user is a real person using a real device, and not a malicious software simulating one or many visitors.

Examples of such methods exist in the field of network connectivity. Typically, a user wants to access resources on a wireless network when they are guests at a corporation with which they have no prior or permanent relation. For instance, CA2647684 describes a system and method for enabling secure user connectivity to wireless and wired IP communication networks. The method includes an authentication interface accepting user credentials, and a validation entity for credential verification and access authorization. The user communicates through a laptop computer, or personal digital assistant or IP telephone with a web based authentication interface to provide his cellular telephone number. The validation entity will verify the existence of an account indexed by the cellular telephone number and transmit a password to the cellular telephone number of the user through SMS. The user enters both his cellular telephone number and received password into the web authentication interface. This method requires at least two different devices and may discourage the user from trying the application at all.

US20190058707 discloses systems and methods for accessing protected data. A mobile device obtains a first token from an authorization service verifying user identity for a first application. The mobile device can then use the token to access protected data and services. The first token is stored in a shared storage area accessible to one or more applications. If the user attempts to access a web service using a second application, his/her identity may be verified using the first token, an identifier of the second application and a device identifier. However the user must be registered to the authorization service first, and access to protected data may not be granted to users acting or logging in as a guest. Such users will be considered as anonymous and will not retrieve tracks of their previous interactions with the app.

Object and Definition of the Invention

It is therefore an object of the invention to provide access to a mobile application in guest mode, while maintaining ease of use and a high level of information security and data privacy.

It is another object of the invention to facilitate the authentication and registration of users and retrieval of their previous interaction history whenever they decide to create a permanent account.

It is a further object of the invention to ensure that the user is a real person using a real device, and not an attacker or a malicious software simulating one or many visitors.

The objects are achieved by method for allowing unique and unambiguous identification of users, and re-identification of the same users and retrieval of their previous interactions during subsequent connections to the mobile application.

More particularly, the invention relates to a method for identifying as a guest a user of a mobile application installed on a mobile device of the user, comprising the steps of:

following a selection of the user to use the mobile application in guest mode, sending by the mobile application an access request to a web server of a web platform operated by a provider of the mobile application, including a device token generated by a trusted provider operating a push notification service, generating by the web server a guest user ID and sending the guest user ID to the mobile application, generating by the web server a passcode and sending the passcode along with the device token to the trusted provider, relaying by the trusted provider through the push notification service the passcode to the mobile device and then to the mobile application, returning by the mobile application the passcode along with the guest user ID to the web server, verifying by the web server that the returned passcode matches the guest user ID and, in case of positive match creating by the web server a user account in a database of the web platform, using the guest user ID as identifier if the user account does not already exist in the database.

Advantageously, the guest user ID is uniquely generated from the device token.

Preferably, the passcode is a one-time passcode that is generated from the guest user ID and a counter incremented at regular time intervals.

Advantageously, the method further includes the steps of generating by the web server, and sending to the mobile application, a session-based access token that is used for subsequent communications between the mobile application and the web server.

Preferably, the session-based access token includes the guest user ID and the session-based token is valid for a limited time period.

Advantageously, the method further includes the step of giving access to the user to the features of the mobile application available to guest users.

Preferably, the method further includes the steps of recording in the database the interactions of the user with the mobile application under the user account corresponding to the guest user ID.

Advantageously, the method further includes the step of erasing the passcode and guest user ID from a memory of the mobile application if the session is ended by the user, by closing the mobile application or not using it for a given period of time.

Advantageously, the method further includes the steps of retrieving in the database a history of the interactions recorded under the user account corresponding to the guest user ID and making it available to the user each time the user selects to use the mobile application in guest mode if the user account already exists.

The invention also relates to a method of authenticating and registering a user of a mobile application installed on a mobile device already identified as a guest by a guest user ID in a database of a web platform operated by a provider of the mobile application, including the steps of:

following a selection of the user to register, entering by the user login information into the mobile application, sending by the mobile application the login information to a web server of the web platform, generating by the web server a verification code and using the login information for sending a message including the verification code to the user, entering by the user the verification code into the mobile application, returning by the mobile application the verification code to the web server, verifying by the web server the verification code to authenticate the user, updating by the web server a user account corresponding the guest user ID in the database with the login information and registering the user.

Advantageously, the method further includes the step of linking an interaction history corresponding to the guest user ID to the login information in the database.

Preferably, the method further includes the step of sending by the web server a confirmation message to the mobile application.

Advantageously, the method further includes the step of making additional features only available to registered users of the mobile application available to the user.

Preferably, the login information includes an email address or a phone number of the user and a password.

BRIEF DESCRIPTION OF THE DRAWINGS

The invention will be described and explained with additional specificity and detail through the use of the accompanying drawings in which.

DETAILED DESCRIPTION OF EXEMPLARY EMBODIMENTS

Figure 1:
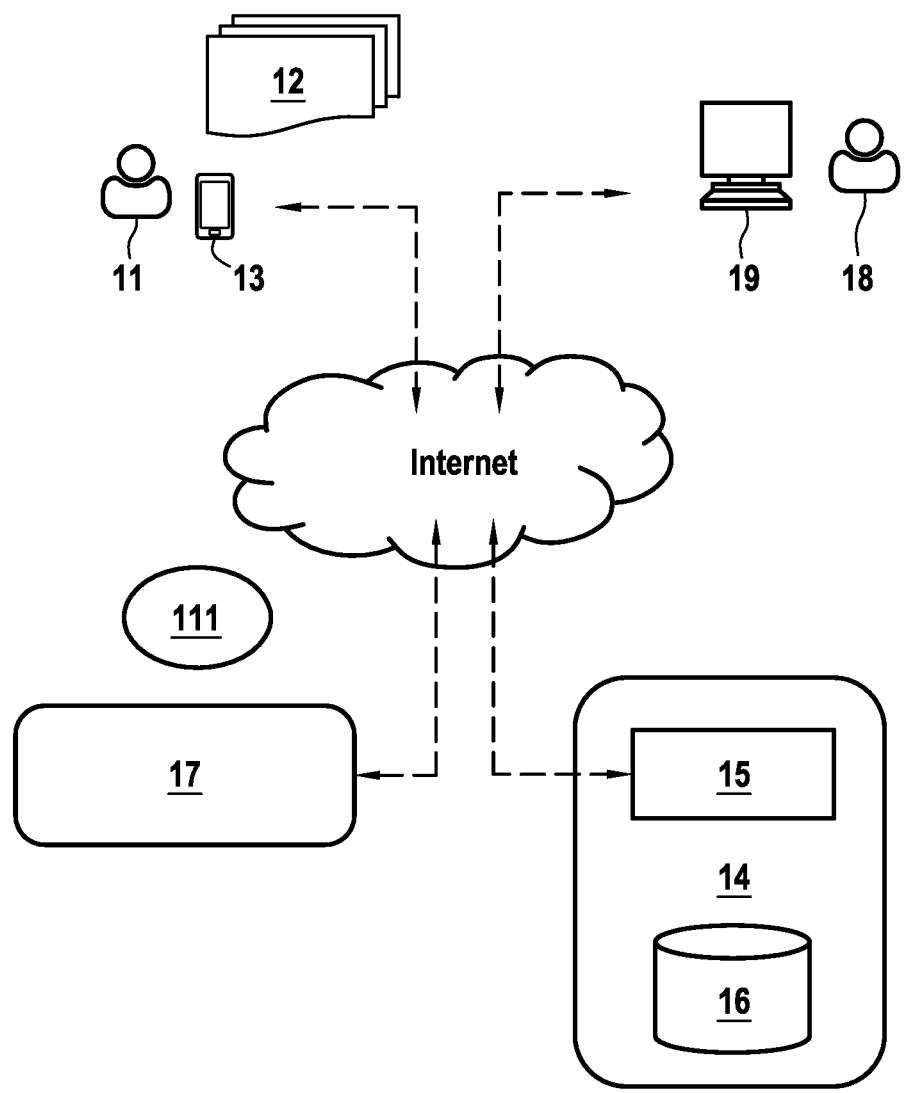
FIG. 1 is a schematic view of an identification system according to the invention.

FIG. 1 is a schematic view of an identification system according to the invention.

A legitimate user 11 has downloaded and installed a mobile application 12 on his/her mobile device 13 and wants to use it in guest mode. The mobile application provider operates a web platform 14 including typically a web server 15 and a database 16. The database contains a list of registered users, a list of guest users and an interaction history of both registered and guest users. The registered users are identified by a user ID associated with their login information (identifier, password). Guest users are identified by a guest user ID as will be described hereafter. Once successfully installed on the mobile device 13, the mobile application 12 invokes web services available from the web server 15 though the Internet, allowing the user to perform various transactions, which may include payment for the services provided.

The identification system further involves a trusted provider 17 such as Apple Inc. or Google Inc. (depending on which operating system is running on the mobile device) which guarantees that the mobile device 13 is a legitimate device though its push notification service (Apple Push Notification Service and Google Cloud Messaging respectively). A push notification is an alert message that can be sent by the mobile application provider and received by the mobile device 13 whether the mobile application 12 is running or not. The alert can be related to a specific event, such as the expiration of a trial period, or trigger an application update whenever a new version becomes available. When the mobile application 12 is running, it can receive the alert message in silent mode, without the user 11 being aware of it.

After the application 12 has been installed, it sends a device token request to the trusted provider 17, which generates a device token 111 and sends it to the mobile device 13 through its push notification service. A device token is a unique key for the app-device combination which is issued by the Apple or Google push notification gateways. It allows gateways and push notification providers to route messages and ensure the notification is delivered only to the unique app-device combination for which it is intended.

Apple/iOS device tokens are strings of 64 hexadecimal symbols. Here is a typical example:
740f4707 bebcf74f 967c25d4 8e335894 5f6aa01d a5ddb387 462c7eaf 61bb78ad Google/Android device token may be longer but usually less than 255 characters. Here is a typical example:
APA91bHLUfr71D6K7VTrRH3LGiLFxGNr3qRi3x0B_yNl0fLYsqhlgYXxHzOhQx2WKgqZI3sqxa1ZPORa0-5YBZ1_OFLm9cEg1bTh7wtrpCsHW91MSs2BMIXrHEqyjj2-TeoVxnAzA5U8s Once the device token 111 is received by the mobile device 13, it is saved by the mobile application 12 for further connections. Each time a guest user needs to be identified, the mobile application 12 will send the device token 111 to the mobile application provider web platform 14. This device token 111 will be used by the mobile application provider each time he wants to send a message to the user 11. The message goes through the Apple or Google push notification service, which relays it to the mobile device 13, then to the mobile application 12 in silent mode. The present invention benefits from this mechanism to identify guest users in a secure manner, and block a potential attacker 18 trying to impersonate legitimate users from a computer 19.

Figure 2:
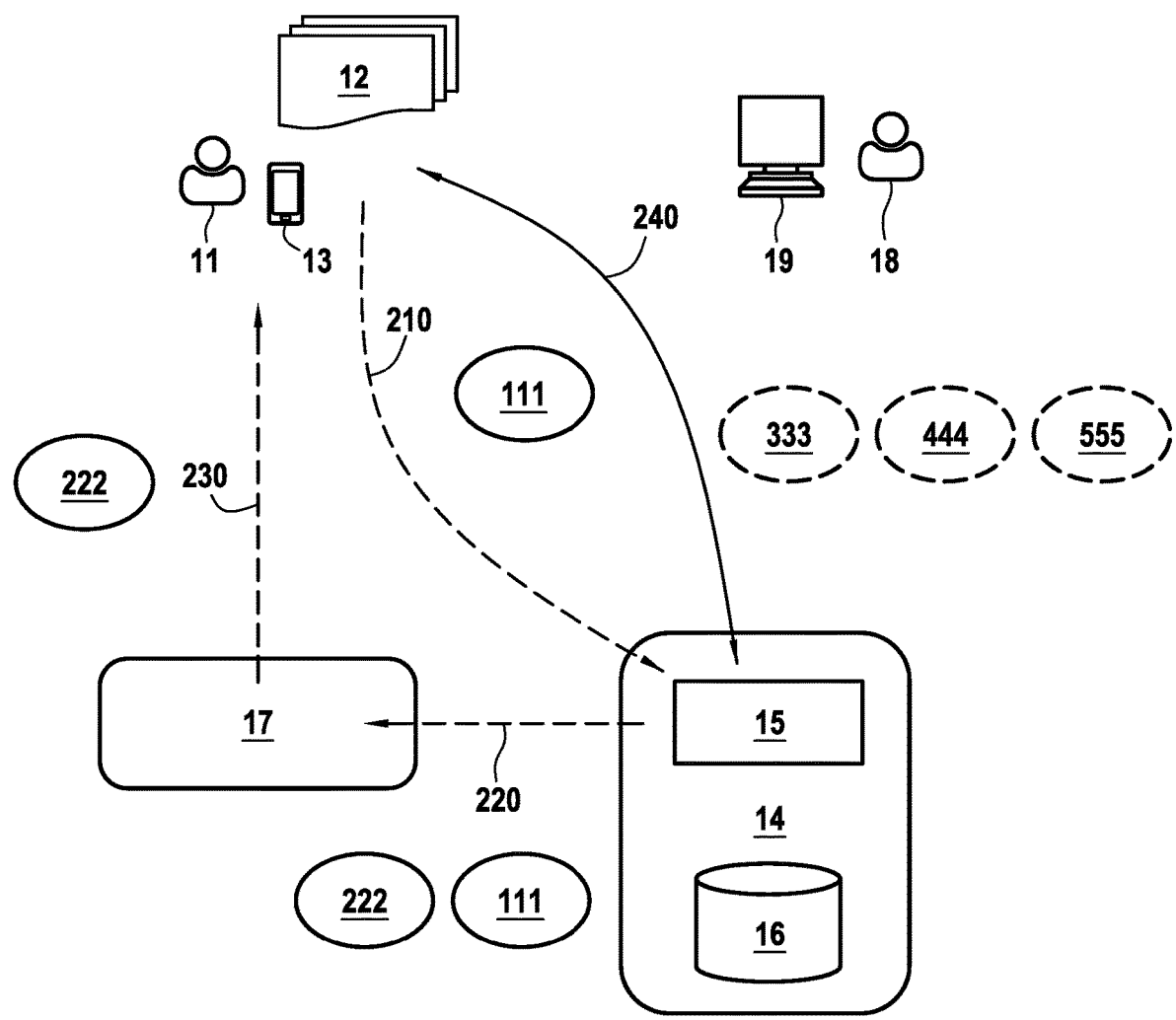
FIG. 2 shows a general flowchart of the method of the invention.

FIG. 2 shows a general flowchart of the method of the invention;

The user 11 wants to use the mobile application 12 already installed on his mobile device 13. At step 210, the mobile application 12 sends an access request to the web server 15 including the device token 111. At step 220 the web server 15 sends a passcode 222 along with the device token 111 to the trusted provider 17, which relays the passcode 222 to the mobile device 13 through its push notification service at step 230. The passcode 222 is then used by the mobile application 12 at step 240 to give access to the web services available from the web server 15 and enable the user 11 to perform the corresponding transactions. All these steps can be performed automatically without any user interaction. Subsequent communications between the mobile application 12 and the web server 15 also involve a guest user ID 333, a session-based access token 444 and a verification code 555, as will be described hereafter.

Figure 3:
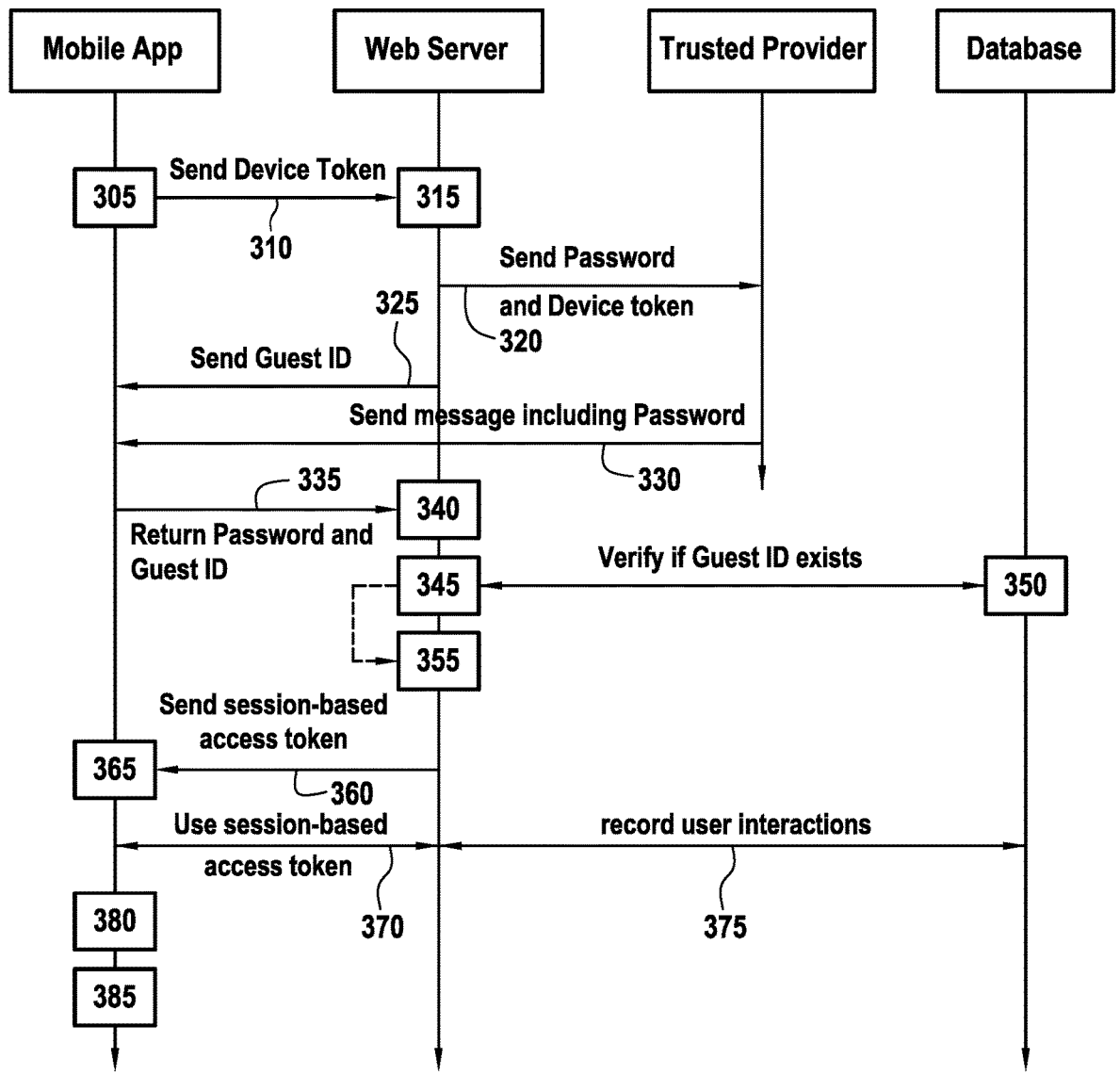
FIG. 3 shows a guest user identification process according to the method of the invention; and, FIG. 4 shows a guest user authentication and registration process according to the method of the invention.

FIG. 3 shows a guest user identification process according to the method of the invention.

The first steps are basically the same as explained above. We assume that the user 11 has already installed the mobile application 12 on her/his device 13 and selects to use it for the first time in guest mode. The mobile application with typically show a virtual button with a text like "Use as Guest" or "Give it a try" next to the regular login or signup window.

Once the user 11 has pressed this virtual button in a step 305, the mobile application 12 sends in a step 310 an access request to the web server 15 including the device token 111. At step 315 the web server 15 generates a guest user ID 333 and a passcode 222. The user ID 333 is uniquely generated from the device token 111 and can be regenerated each time the device token 111 is received by the web server 15. The passcode 222 is preferably a one-time password that is generated from the guest user ID 333 and a counter with a secret key using an encryption algorithm. The counter is incremented at regular time intervals, for instance every five seconds, so that the web server 15 can easily check a previous password generated within a predefined validity time window using a verification algorithm.

At step 320, the web server sends the passcode 222 along with the device token 111 to the trusted provider 17. At step 325, the web server sends the guest user ID 333 to the mobile application 12. Alternatively step 320 and 325 may be performed in reverse order. All these communications happen over standard TCP/IP protocol.

At step 330, the trusted provider 17 uses the device token 111 to relay the passcode 222 through its push notification service to the mobile device 13, then to the mobile application 12.

At step 335, the mobile application 12 returns the passcode 222 along with the guest user ID 333 to the web server 15. At step 340, the web server 15 verifies that the passcode 222 matches the guest user ID 333. In case of a positive match, the web server 15 checks at step 345 whether a user account corresponding to the guest user ID 333 already exists in the database 16 and, if it is not the case, creates a user account in the database 16 at step 350, using the guest user ID 333 as identifier. All subsequent interactions of the user 11 with the mobile application 12 will be recorded in the database 16 under this user account. If a user account already existed, as may be the case for subsequent connections, the process would go directly from step 345 to step 355.

An attacker 18 willing to impersonate a guest user, or simulate thousands of guest users to cause a denial of service will not pass the test of step 340 and will not be given access to the features of the mobile application 12 available to guest or registered users. Indeed, only a legitimate user 11 of the mobile device 13 recorded by the trusted provider 17 will receive the passcode 222 through the push notification service.

At step 355, the web server generates a session-based access token 444, including the guest user ID 333, and sends it to the mobile application 12 at step 360. The session-based access token 444 is preferably a web token issued from an industry standard such as RFC 7519. Here is a typical example:
eyJhbGciOiJIUzI1NiIsInR5cCI6IkpXV09.eyJzdWIiOiIx-MjM0NTY3ODkwIiwibmFtZSI6IkpvaG4gRG9lIiwiaWF-0IjoxNTE2MjM5MDIyfQ.SflKxwRJSMeKKF2QT4fwp-MeJf36POk6yJV_adQssw5c At step 365, the user 11 is given access to the features of the mobile application 12 available to guest users. The session-based access token 444 will be used at step 370 for all subsequent communications between the mobile application 12 and the web server 15 during that session. At a step 375, the interactions of the user 11 with the mobile application 12 are recorded in the database 16 under the user account corresponding to the guest user ID 333.

At step 380, the session ends because the user 11 closes the mobile application 12 or has not used it for a certain period of time. The guest user ID 333 and the session-based access token 444 are preferably erased from a memory of the mobile application 12 at step 385.

The session-based access token 444 may also be valid for a limited period of time of typically one hour, and the steps 310 to 345 are repeated once this period has expired without the user 11 being aware of it, even while he/she is using the mobile application 12. As the user account already exists, the process will resume at step 455.

The device token 111 is retrieved by the mobile application 12 and resent each time the user 11 selects to use the mobile application in guest mode. The steps 310 to 345 are repeated. The device token 111 is returned with a new access request from the mobile application 12 to the web server 17, and a new passcode 222' is generated. In this manner, the legitimacy of the user 11 is verified and a new session-based access token 444' is generated at each connection. As the guest user ID 333 is unique to the device token 111, the corresponding interaction history is retrieved from the database 16 and made available to the user 11.

Preferably, the device token 111 may be stored in the database 16 along with the guest user ID 333, for sending push notification messages to the user 11 for any other purpose. However it is not required to store it for the sole purpose of guest user identification as it will be resent each time the user 11 selects to use the mobile application 12 in guest mode.

It shall be noted that a new device token 111' may be generated each time a user installs the mobile application on a new device, reinstalls the mobile application on the same device, restore the device data from a backup or clears the application data. In any of those cases, a new guest user ID will be generated and the previous interaction history will no longer be available to the user 11, although it may be kept in the database 16 for analytics purposes and retrieved later on by a system administrator.

Figure 4:
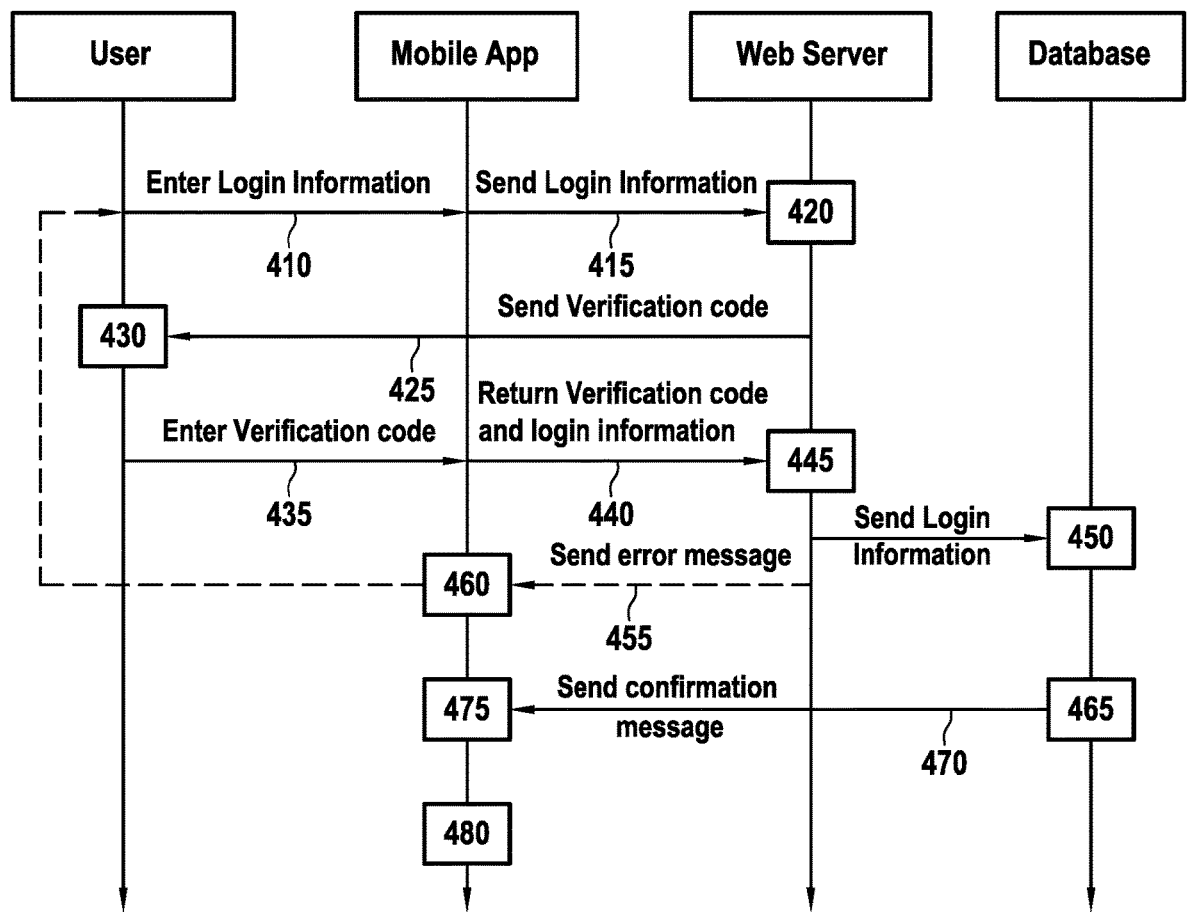

FIG. 4 shows a guest user authentication and registration process according to the method of the invention.

As explained above, some of the mobile application features (i.e. additional features) may only be available to registered users and not to guest users. After using the mobile application 12 in guest mode for some time, the user 11 may select to register. In the following, we assume that the session-based access token 444 is still valid and is used by the mobile application 12 to communicate with the web server 15. As described above, the guest user ID 333 is included in the session-based access token 444.

At step 410, the user 11 enters login information, typically an email address and a password in the mobile application 12 and press a "Register" button (or alternatively press a register button before entering login information). At step 415, the mobile application sends the login information to the web server 15. At step 420, the web server 15 generates a verification code 555 and sends it at step 425 to the email address of the user 11 through an external email server (not represented). The verification code 555 is typically a short 6-digits string that can be easily read and keyed-in by the user 11. The verification code 555 is preferably a one-time password generated from the login information using a similar encryption algorithm as in step 315. Alternatively, the verification code may be generated from the guest user ID 333 included in the session-base access token 444.

At step 430, the user 11 receives the email and enters it at step 435 into the mobile application 12, which returns it along with the login information to the web server 15 at step 440.

At step 445, the web server 15 verifies the verification code 555 against the login information (or alternatively the guest user ID 333) to authenticate the user 11. If this verification is successful, the user account corresponding to the guest user ID 333 is updated in the database 16 with the login information at step 450. The user 11 becomes a registered user. The same guest user ID 333 may serve to identify the user 11 in subsequent interactions or a new user ID, based for instance on his/her login information, may be created.

If any of the steps 420 to 445 above fails, for instance because the email address is invalid, or the verification code 555 is not returned within a time period of typically five minutes, an error message is sent at step 455 by the web server 15 to the mobile application 12 and displayed to the user 11 at step 460. The user 11 may then retry his/her registration by entering login information again or continue to use the mobile application 12 in guest mode.

Otherwise, the process continues and at step 465 the interaction history corresponding to the guest user ID 333 is linked to the login information in the database 16. This will enable the user 11 to retrieve his/her previous interaction history when login with his/her email address and password. At step 470 a confirmation message is sent by the web server 15 to the mobile application 12 and displayed at step 475 for informing the user 11 that he/she is successfully registered. Finally, the user 11 is given access to the additional features of the mobile application 12 at step 480.

Alternatively, if at step 410 the previous session-based access token 444 has expired, the mobile application 12 may retrieve the device token 111 and send a new access request.

The steps 310 to 345 are repeated and a new session-based access token 444 is generated. The registration process will then resume at step 415.

The steps 310 to 345 may also be repeated during a regular login session. In this manner, an attacker 18 having stolen the login information, but not in possession of the mobile device 13, will be blocked from accessing the interaction history of the user 11. However the latter may not be able either to retrieve his/her own account information from another device, unless it is unlocked and/or migrated by a system administrator. Similarly, the identification process of the invention may be used to limit the number of (guest or registered) user accounts that can be enabled on the same mobile device.

A phone number may be entered as part of login information instead of an email address, provided that it can be used to send the verification code 555 to the user 11. Indeed, the mobile application provider may prefer to communicate with its users in this manner.

A temporary password may be used as the passcode 222 or the verification code 555 instead of a one-time password. In this case, it would have to be stored in the database 16 together with the guest user ID 333 or the login information until it can be verified by the web server 15 after being returned by the mobile application 12.

The method of the invention allows the identification and re-identification of guest users until (and after) they become registered users. It facilitates the testing of a new mobile application without creating a permanent account, while recording the interaction history and unique profile created by a legitimate user and blocking potential attackers.

I claim:

1. A method for identifying as a guest a user of a mobile application installed on a mobile device of the user, comprising:
following a selection of the user to use the mobile application in guest mode, sending by the mobile application an access request to a web server of a web platform operated by a provider of the mobile application, including a device token generated by a trusted provider operating a push notification service,
generating by the web server a guest user ID and sending the guest user ID to the mobile application,
generating by the web server a passcode and sending the passcode along with the device token to the trusted provider,
relaying by the trusted provider through the push notification service the passcode to the mobile device and then to the mobile application,
returning by the mobile application the passcode along with the guest user ID to the web server,
verifying by the web server that the returned passcode matches the guest user ID and, in case of positive match, and
creating by the web server a user account in a database of the web platform, without any user interaction, using the guest user ID as identifier if the user account does not already exist in the database.

2. The method of claim 1, wherein the guest user ID is uniquely generated from the device token.

3. The method of claim 1, wherein the passcode is a one-time passcode that is generated from the guest user ID and a counter incremented at regular time intervals.

4. The method of claim 1, further including generating by the web server, and sending to the mobile application, a session-based access token that is used for subsequent communications between the mobile application and the web server.

5. The method of claim 4, wherein the session-based access token includes the guest user ID.

6. The method of claim 4, wherein the session-based token is valid for a limited time period.

7. The method of claim 1, further including giving access to the user to the features of the mobile application available to guest users.

8. The method of claim 1, further including recording in the database the interactions of the user with the mobile application under the user account corresponding to the guest user ID.

9. The method of claim 1, further including erasing the passcode and guest user ID from a memory of the mobile application if the session is ended by the user, by closing the mobile application or not using it for a given period of time.

10. The method of claim 1, further including retrieving in the database a history of the interactions recorded under the user account corresponding to the guest user ID and making it available to the user each time the user selects to use the mobile application in guest mode if the user account already exists.

11. A method of authenticating and registering a user of a mobile application installed on a mobile device already identified as a guest by a guest user ID in a database of a web platform operated by a provider of the mobile application according to claim 1, further including:

following a selection of the user to register, entering by the user login information into the mobile application, sending by the mobile application the login information to a web server of the web platform, generating by the web server a verification code and using the login information for sending a message including the verification code to the user, entering by the user the verification code into the mobile application, returning by the mobile application the verification code to the web server, verifying by the web server the verification code to authenticate the user, and updating by the web server a user account corresponding the guest user ID in the database with the login information and registering the user.

12. The method of claim 11, further including linking an interaction history corresponding to the guest user ID to the login information in the database.

13. The method of claim 11, further including sending by the web server a confirmation message to the mobile application.

14. The method of claim 11, further including making additional features only available to registered users of the mobile application available to the user.

15. The method of claim 11, wherein the login information includes an email address or a phone number of the user and a password.

* * * * *